United States Patent
Baur et al.

(10) Patent No.: US 9,252,438 B2
(45) Date of Patent: Feb. 2, 2016

(54) FUEL CELL SYSTEM COMPRISING A WATER SEPARATOR

(75) Inventors: Holger Baur, Leinfelden-Echterdingen (DE); Uwe Pasera, Esslingen (DE); Hans-Joerg Pflugfelder, Ditzingen (DE); Karl Schaufler, Bissingen (DE); Sven Schmalzriedt, Esslingen (DE); Simon Steinhuebl, Holzmaden (DE); Harald Teves, Stuttgart (DE)

(73) Assignee: Daimler AG, Stuttgart (DE)

( * ) Notice: Subject to any disclaimer, the term of this patent is extended or adjusted under 35 U.S.C. 154(b) by 163 days.

(21) Appl. No.: 14/237,116

(22) PCT Filed: Jul. 21, 2012

(86) PCT No.: PCT/EP2012/003090
§ 371 (c)(1),
(2), (4) Date: Feb. 4, 2014

(87) PCT Pub. No.: WO2013/020647
PCT Pub. Date: Feb. 14, 2013

(65) Prior Publication Data
US 2014/0178779 A1     Jun. 26, 2014

(30) Foreign Application Priority Data
Aug. 5, 2011 (DE) .......................... 10 2011 109 644

(51) Int. Cl.
*H01M 8/04* (2006.01)

(52) U.S. Cl.
CPC ...... *H01M 8/04156* (2013.01); *H01M 8/04164* (2013.01); *H01M 8/04231* (2013.01); *H01M 8/04111* (2013.01); *H01M 8/04253* (2013.01); *Y02E 60/50* (2013.01)

(58) Field of Classification Search
CPC .............. H01M 8/04164; H01M 8/04156; H01M 8/04231; H01M 8/04111; H01M 8/04253
See application file for complete search history.

(56) References Cited

U.S. PATENT DOCUMENTS

| | | | |
|---|---|---|---|
| 2002/0142200 A1 | 10/2002 | Formanski et al. | |
| 2008/0090124 A1* | 4/2008 | Barleben | H01M 8/04037 429/440 |
| 2013/0004866 A1 | 1/2013 | Gerhardt et al. | |

FOREIGN PATENT DOCUMENTS

| | | |
|---|---|---|
| DE | 101 15 336 A1 | 10/2002 |
| DE | 10 2009 014 590 A1 | 9/2010 |
| DE | 10 2009 014 592 A1 | 9/2010 |

(Continued)

OTHER PUBLICATIONS

Corresponding International Search Report with English Translation dated Oct. 17, 2012 (six (6) pages).

*Primary Examiner* — Milton I Cano
*Assistant Examiner* — Stephen Yanchuk
(74) *Attorney, Agent, or Firm* — Crowell & Moring LLP

(57) ABSTRACT

A fuel cell system includes a fuel cell with an anode chamber and a cathode chamber. The fuel cell system also includes a recirculation device that recirculates anode exhaust gas to the anode input, which includes a discharge line for discharging liquid and/or gas from the region of the recirculation device, and an air conveying device for supplying the cathode chamber with a supply air flow. A water separator, which is connected to the discharge line and through which at least a portion of the supply air flow passes, is situated between the air conveying device and the cathode chamber in the area of the supply air flow.

8 Claims, 2 Drawing Sheets

(56) References Cited

FOREIGN PATENT DOCUMENTS

| EP | 1 296 402 A1 | 3/2003 |
| EP | 1 542 305 A1 | 6/2005 |
| WO | WO 2008/052578 A1 | 5/2008 |
| WO | WO2011/098279 A1 | 8/2011 |

* cited by examiner

FUEL CELL SYSTEM COMPRISING A WATER SEPARATOR

BACKGROUND AND SUMMARY OF THE INVENTION

Exemplary embodiments of the invention relate to a fuel cell system having at least one fuel cell.

German patent document DE 101 15 336 A1 discloses a fuel cell system having a recirculation device for recirculating the anode exhaust gas into the anode input. In these types of systems nitrogen and water become concentrated in the recirculated anode exhaust gas over time. For this reason, it is known from the general prior art and also described in the above-cited publication that valve units are situated in the area of the recirculation line which are occasionally opened in order to appropriately blow off the nitrogen from the region of the recirculation line and the region of the anode chamber. According to DE 101 15 336 A1, the "disposal" of this exhaust gas from the area of the anode loop may take place in various regions, which typically each have a catalytic surface or are in connection with a further component having such a catalytic surface. This design is thus common, since together with the nitrogen, a small quantity of hydrogen will also always be present in the discharged gas, which may be made harmless in this manner. DE 101 15 336 A1 discloses a water separator in the region of the recirculation line to allow discharge the product water of the fuel cell occurring in the area of the anode exhaust gas.

A fuel cell system having a recirculation device is likewise known from International Application WO 2008/052578 A1, which is referred to therein as a fuel circuit. The special feature of this design is that the functionality of the water separator having a discharge valve for discharging the water and the functionality of the relief valve for blowing off the nitrogen-containing gas are combined. According to the design, a water separator having a corresponding valve unit is provided. Whenever an appropriately large quantity of water has accumulated, it is discharged from the water separator via the valve unit. After the water has been discharged, gas also exits from the recirculation device via the valve unit of the water separator before the valve unit is closed once again. The functionality, which in the above-cited publication is distributed over two independent components, is thus integrated into a single component.

The problem with the simultaneous discharge of water and gas arises when the discharge occurs in the cathode chamber of the fuel cell, which is indicated in the cited WO publication as optional. The catalyst, which is present there anyway, may be utilized to avoid possible hydrogen emissions. On the other hand, however, the water, which is likewise discharged from the region of the recirculation device, may result in impairment of the functionality of the fuel cells. Tests have shown that this introduction of water may impair the efficiency of individual fuel cells, thus adversely affecting the overall performance of the fuel cell.

Exemplary embodiments of the present invention are directed to an improved fuel cell system that avoids, by a simple system design, these functional impairments minimizes the amount of catalyst material required.

According to the invention a fuel cell system having a recirculation device has a design that is comparable to the prior art, and via a discharge line conducts liquid and/or gas from the region of the recirculation device into the region of a supply air line or a supply air flow to the cathode chamber of the fuel cell. According to the invention, a water separator, which is connected to the discharge line and through which at least a portion of the supply air flow passes, is situated between the air conveying device and the cathode chamber. This water separator is used to separate the water conveyed from the mixture through the discharge line and otherwise discharge it from the fuel cell system, so that liquid water is not able to pass into the region of the cathode chamber. On the other hand, the aim is for the gaseous portion, which flows through the discharge line from the region of the water separator and which typically contains a residual amount of hydrogen, to be securely and reliably conducted into the region of the cathode chamber in order to prevent hydrogen emissions from the fuel cell system to the environment.

In another very advantageous embodiment of the fuel cell system according to the invention, a partial flow of the supply air flow passes through the water separator. According to one very advantageous refinement, the partial air flow constitutes up to 25 percent, preferably approximately 10 percent, of the volume flow of the supply air flow. As the result of only a partial air flow of the supply air flow being conducted through the water separator, a comparatively low flow velocity of the partial air flow and of the gas mixture originating from the discharge line may be achieved in the region of the liquid separator, even with a small installation size. Such a low flow velocity is a prerequisite for reliable separation of liquid from the liquid-gas mixture. As a result, all of the gas passes into the region of the cathode chamber, where the hydrogen present in the gas completely reacts on the catalytic material of the cathode chamber, thus preventing hydrogen emissions to the environment.

Such a water separator through which only a partial air flow passes thus allows a small installation size with very good separation, so that the introduction of liquid water into the cathode chamber may be largely avoided, thus enabling higher efficiency and a longer service life of the fuel cell.

In another very advantageous embodiment of the fuel cell system according to the invention, the partial air flow from the water separator flows upwardly in the direction of the force of gravity during proper operation, and upstream from the cathode chamber is recombined with the remainder of the supply air flow from which it has branched off. This arrangement in which the partial air flow passes vertically upwardly through, and in particular downstream from, the water separator for at least a segment further improves the separation of the water.

In another very advantageous embodiment of the fuel cell system according to the invention, it may also be provided that a catalytic material that facilitates the reaction of hydrogen with oxygen to form water is situated in the region of the water separator. Such a catalytic material may be situated in the region of the water separator, for example in the form of a coating or the like. The catalytic material may ensure that hydrogen, which passes via the discharge line into the region of the water separator, is reacted with oxygen from the partial air flow of the supply air flow to form water. A suitable mixture may be achieved by an appropriate selection of the magnitude of the supply air flow. Thus, the conversion of the hydrogen is already achieved at least partially outside the cathode chamber, and the resulting water is appropriately discharged via the water separator. When the water separator is dry and the valve unit is open in a water line for discharging the water, such a catalytic material in the region of the water separator may also thus ensure that little or no hydrogen passes to the environment, since, due to the catalytic material in the region of the water separator, the hydrogen is reacted, at least partially, with the atmospheric oxygen to form water.

In another very advantageous embodiment of the fuel cell system according to the invention, the water separator is actively or passively heatable. The water separator may be actively heated, for example, via an electric heater or the like, since with regard to a cold start of the fuel cell system at temperatures below the freezing point, the water separator may be critical with respect to freezing water. This water could be thawed via such active heating. In principle, of course, it would also be conceivable to carry out the heating in some other way, for example passively, in that the water separator is in thermal contact with a heated component on the part of the water separator, and/or is in thermal contact with a component that is heated by the start-up operation of the fuel cell, for example in contact with the cooling water.

BRIEF DESCRIPTION OF THE DRAWING FIGURES

Further advantageous embodiments of the invention are made clear based on the exemplary embodiment which is explained in greater detail below with reference to the figures, which show the following:

DETAILED DESCRIPTION

Figure 1:
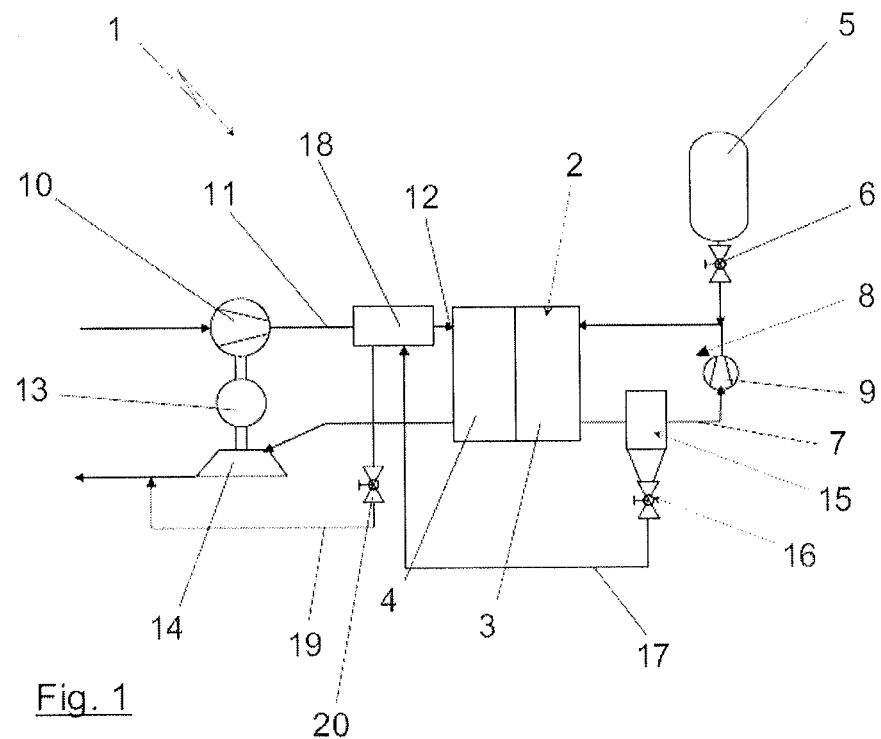
FIG. 1 shows a schematic illustration of a fuel cell system in one possible embodiment according to the invention.

FIG. 1 illustrates, in a highly schematic manner, a fuel cell system 1 according to the present invention. The most important component of the fuel cell system 1 is a fuel cell 2, which is typically designed as a stack of individual fuel cells as a so-called fuel cell stack. The fuel cell 2 has an anode chamber 3 and a cathode chamber 4, which in the exemplary embodiments illustrated here are designed to be separated from one another by a proton-conducting membrane (PEM) in each case. The fuel cell 2 is thus a so-called PEM fuel cell stack.

The anode chamber 3 of the fuel cell 2 is supplied from a hydrogen store unit 5 via a metering valve 6 as well as a line element containing hydrogen from the hydrogen store unit 5. In the region of the anode chamber 3, unreacted hydrogen passes via a recirculation line 7 of a recirculation device 8 back into the area in which the fresh hydrogen flows to the anode chamber 3 via the metering valve 6. Thus, in a manner known per se, the recirculation line 7 conducts unconsumed gas in the anode exhaust gas from the region of the anode chamber 3 back to the anode input, the gas being mixed with fresh hydrogen from the hydrogen store unit 5. To compensate for pressure losses in the anode chamber 3, a recirculation conveying unit 9, which provides for the recirculation of the unconsumed gas from the anode chamber 3, is also situated in the region of the recirculation line 7 as a part of the recirculation device 8. The recirculation conveying unit 9 may be designed as a hydrogen recirculation blower, as indicated in FIG. 1. Additionally or alternatively, a gas jet pump would be conceivable, which is driven by the hydrogen from the hydrogen store unit 5, and which appropriately draws in the gas from the region of the recirculation line 7, mixes it with the fresh hydrogen, and supplies it to the anode chamber 3.

In the exemplary embodiment illustrated here, the cathode chamber 4 of the fuel cell 2 is supplied with air. The oxygen contained in the air is used as an oxidizing agent for the chemical reaction inside the fuel cell 2, and together with the hydrogen forms water in a manner known per se, thus releasing electrical power which may be appropriately tapped at the fuel cell 2. The air for the cathode chamber 4 is appropriately compressed via an air conveying device 10 and supplied via a supply air line 11 to the input 12 of the cathode chamber 4. Further components such as air filters or the like (which are not illustrated here for the sake of simplicity) may be present for conditioning the air. The air conveying device 10 may be designed as a compressor, for example a screw compressor. However, in the exemplary embodiment illustrated here, the air conveying device 10 should be designed as a flow compressor that is combined, via a shaft, with an electric machine 13 and with a turbine 14. This design, likewise known from the prior art, is also referred to as an electric turbocharger (ETC). Energy in the form of pressure and heat that is present in the exhaust gas from the cathode chamber 4 may be appropriately recovered. The air conveying device 10 may then be operated via the turbine 14, or the operation may be assisted at least via the turbine 14. The further remaining energy, or, in the event that the turbine 14 supplies no energy, the entire amount of energy, for driving the air conveying device 10 may also be provided via the electric machine 13. If the turbine 14 delivers excess energy, so that more energy is present at the turbine 14 than is needed for operating the air compressor 10, the electric machine 13 may then also be operated as a generator in order to convert this mechanical energy that is present into electrical energy, which is then appropriately stored, for example, in a battery of the fuel cell system 1, and/or which may be provided to other electrically operated auxiliary units.

In addition, a water separator 15 is provided in the region of the recirculation line 7, and during operation collects water which accumulates in the region of the anode chamber 3 and which is appropriately discharged via the recirculation line 7. Thus, this liquid water is not able to clog gas channels and the like in the region of the anode chamber 3, so that secure and reliable operation may be guaranteed on the anode side. In the region of the water separator 15, a valve unit 16 is provided in the outlet region of the water separator 15 for discharging this water, thus typically downwardly in the direction of the force of gravity. Connected to the valve unit 16 is a discharge line 17 which opens into the area of the supply air line 11 in the region of a component 18 to be explained in greater detail below. As is known from the prior art, water and exhaust gas from the anode chamber 3 of the fuel cell 2 are now conducted via this discharge line 17 into the region of the component 18. A water line 19 having a valve unit 20 leads from the region of the component 18 into the region of an exhaust gas flow downstream from the turbine 14.

Figure 2:
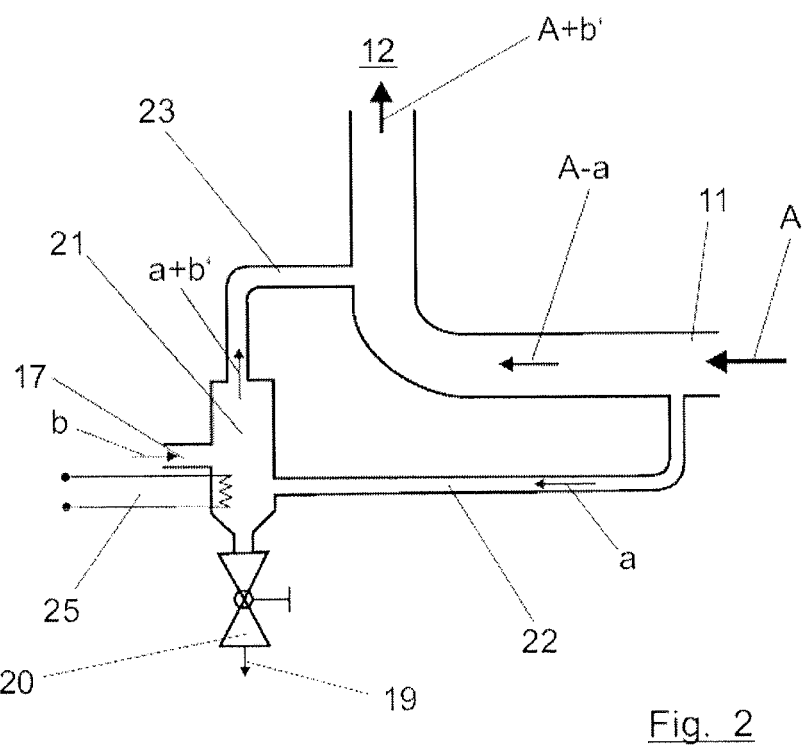
FIG. 2 shows a water separator according to the invention.

The component 18 is shown in greater detail in the illustration in FIG. 2. In the preferred embodiment illustrated here, the component is composed of a water separator 21 into which the discharge line 17 opens. The water accumulated in the water separator 21 may then be introduced via the valve unit 20 and the water line 19 into the region of the exhaust gas from the fuel cell system 1. Of course, alternative options for disposing of the water are likewise conceivable and possible.

Appropriately low flow velocities in the region of the water separator are necessary to achieve a high separation rate in the water separator 21. To still be able to provide the water separator with an appropriately small design, in the design described here the water separator 21 is not integrated into the region of the supply air line 11, but instead is connected to the supply air line 11 solely via two lines 22, 23. As a result, the entire supply air flow, denoted by reference character A in the illustration in FIG. 2, does not flow through the water separator 21. Rather, a partial flow a of the supply air flow A flows into the water separator 21 through the line 22, which branches off from the supply air line 11. The partial air flow a thus flows via the line element 22 into the region of the water separator 21, and at that location is mixed with the mixture b of water and exhaust gas of the anode chamber 3 which flows into the region of the water separator 21 via the discharge line 17. Due to the comparatively small partial air flow a, which in particular is in the range of approximately 10 percent of the overall supply air flow A, an appropriately low flow velocity is achieved in the region of the water separator 21 despite a comparatively small water separator 21. As a result, the water introduced via the discharge line 17 may be separated very well. The water accumulates in the water separator 21, and may be discharged into the exhaust air of the fuel cell system 1 via the valve unit 20, or alternatively, a diaphragm and the water line 19. The partial air flow a mixes with the gas portion b' which flows through the discharge line 17 into the water separator 21, and exits the water separator 21 preferably upwardly in the direction of the force of gravity, in order to separate by the force of gravity any water droplets remaining in the mixture. The gas flow from the partial air flow a and the gas portion b' from the discharge line 17 is denoted by a+b' in FIG. 2, and flows via the line 23 back into the region of the supply air line 11, and mixes there before arriving at the input 12 of the cathode chamber 4 with the remainder of the supply air flow (A−a) to form the gas flow denoted by A+b' in FIG. 2, which then flows into the cathode chamber 4.

In the design of the fuel cell system 1, which is apparent in the illustration in FIG. 1, the additional use of a humidifier known per se, typically in the area upstream from the component 18, is of course conceivable and possible. Since this corresponds to the general prior art, no further explanation is provided for the sake of simplicity in the illustration.

Figure 3:
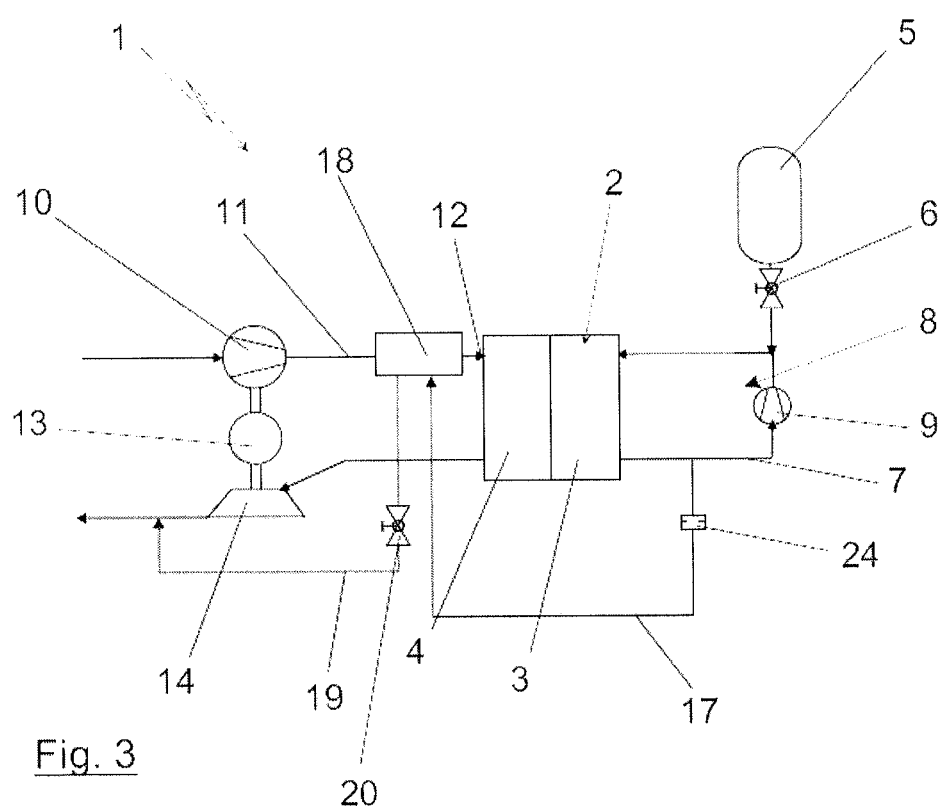
FIG. 3 shows a fuel cell system according to the invention in an alternative embodiment.

A particularly preferred embodiment of the fuel cell system 1 is shown in the illustration in FIG. 3. In contrast to the embodiment of the fuel cell system 1 in the illustration in FIG. 1, this embodiment has no water separator 15 in the area of the recirculation device 8, but instead has only a diaphragm 24, which provides continuous discharge of water and gas through the discharge line 17 into the region of the water separator 21. This is very advantageous with regard to the complexity of components and the installation space. In addition, the complexity of a control system may be minimized. Alternatively, the use of the valve unit 16, but without the water separator 15 instead of the diaphragm 24, would of course be conceivable.

In the preferred design of the fuel cell system 1 according to FIG. 3, the component 18 is identical to the above-described design, in particular with respect to the illustration in FIG. 2.

Alternatively, of course, it would also be conceivable to provide a fixed diaphragm instead of the valve 20 between the water separator 21 and the water line 19, thus ensuring a continuous discharge of the resulting water into the region of the exhaust air of the fuel cell system 1. In that case, the design and/or the control of the valve 16 in the region of the discharge line 17 would have to be implemented in such a way that the hydrogen concentration in the region of the exhaust air preferably remains below 4 percent, even during malfunctions of the fuel cell system 1, in order to avoid safety-critical states. A diaphragm is preferably provided in the discharge line 17 or the water line 19, and a valve unit is provided in the respective other line to be able to reliably stop the escape of hydrogen if necessary.

Since the water separator 21 comes into contact with ultrapure water that is present in the area of the fuel cell 2, this water may very easily freeze at temperatures below the freezing point and impair the functionality of the component 18. The water separator 21 may therefore be designed in such a way that it may be actively heated, as schematically indicated by an electrical resistance heater 25 in the illustration in FIG. 2. Additionally or alternatively, of course, it would be conceivable to carry out the heating via thermal contact with a component which is heated anyway or which is self-heating, and/or with the cooling water.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A fuel cell system, comprising:
    at least one fuel cell with an anode chamber and a cathode chamber;
    a recirculation device recirculating anode exhaust gas to an input of the anode chamber;
    a discharge line discharging liquid or gas from a region of the recirculation device;
    an air conveying device supplying the cathode chamber with a supply air flow;
    an air supply line which connects the air conveying device and the cathode chamber to allow a volume of air to flow therethrough;
    an upstream branched portion of the air supply line in fluid communication with a water separator for passing a partial airflow up to 25 percent of the volume of air of the air supply line therethrough; and
    the water separator to receive air from the upstream branched portion of the air supply line and liquid or gas from the discharge line with outputs from the water separator to an exhaust line for removing water from the system and a downstream branched portion reconnecting the air supply line upstream of the cathode chamber.

2. The fuel cell system according to claim 1, wherein the partial flow constitutes approximately 10 percent of a volume flow of the supply air flow.

3. The fuel cell system according to claim 1, wherein the fuel cell system is configured so that the partial flow from the water separator flows upwardly in a direction of a force of gravity.

4. The fuel cell system according to claim 1, wherein the water separator is connected, via a water line for separated liquid, to an exhaust gas flow from the fuel cell system, wherein the water line includes a diaphragm or valve unit.

5. The fuel cell system according to claim 1, wherein a catalytic material, which facilitates a reaction of hydrogen with oxygen to form water, is situated in a region of the water separator.

6. The fuel cell system according to claim 1, wherein the water separator is arranged within the fuel cell system such that it is heated.

7. The fuel cell system according to claim 1, wherein the discharge line has a diaphragm or a valve unit.

8. The fuel cell system according to claim 1, wherein the discharge line is situated in an area of the recirculation device in a region of at least one water separator.

* * * * *